April 24, 1951 G. T. BAKER 2,550,181

LINE IDENTIFICATION SYSTEM

Filed April 4, 1947 5 Sheets-Sheet 1

INVENTOR
GEORGE THOMAS BAKER

BY Chas. W. Cox[?]

ATTORNEY

April 24, 1951 G. T. BAKER 2,550,181
LINE IDENTIFICATION SYSTEM
Filed April 4, 1947 5 Sheets-Sheet 2

INVENTOR
GEORGE THOMAS BAKER
BY
ATTORNEY

INVENTOR
GEORGE THOMAS BAKER

BY Chas. W. Cardy
ATTORNEY

INVENTOR
GEORGE THOMAS BAKER

BY [signature]

ATTORNEY

April 24, 1951 G. T. BAKER 2,550,181

LINE IDENTIFICATION SYSTEM

Filed April 4, 1947 5 Sheets-Sheet 5

INVENTOR
GEORGE THOMAS BAKER

BY Chas. W. Cardy

ATTORNEY

Patented Apr. 24, 1951

2,550,181

UNITED STATES PATENT OFFICE 2,550,181

LINE IDENTIFICATION SYSTEM

George Thomas Baker, Liverpool, England, assignor to Automatic Telephone & Electric Company Limited, Liverpool, England, a company of Great Britain Application April 4, 1947, Serial No. 739,478
In Great Britain May 25, 1946

11 Claims. (Cl. 179—27)

Figure 1:
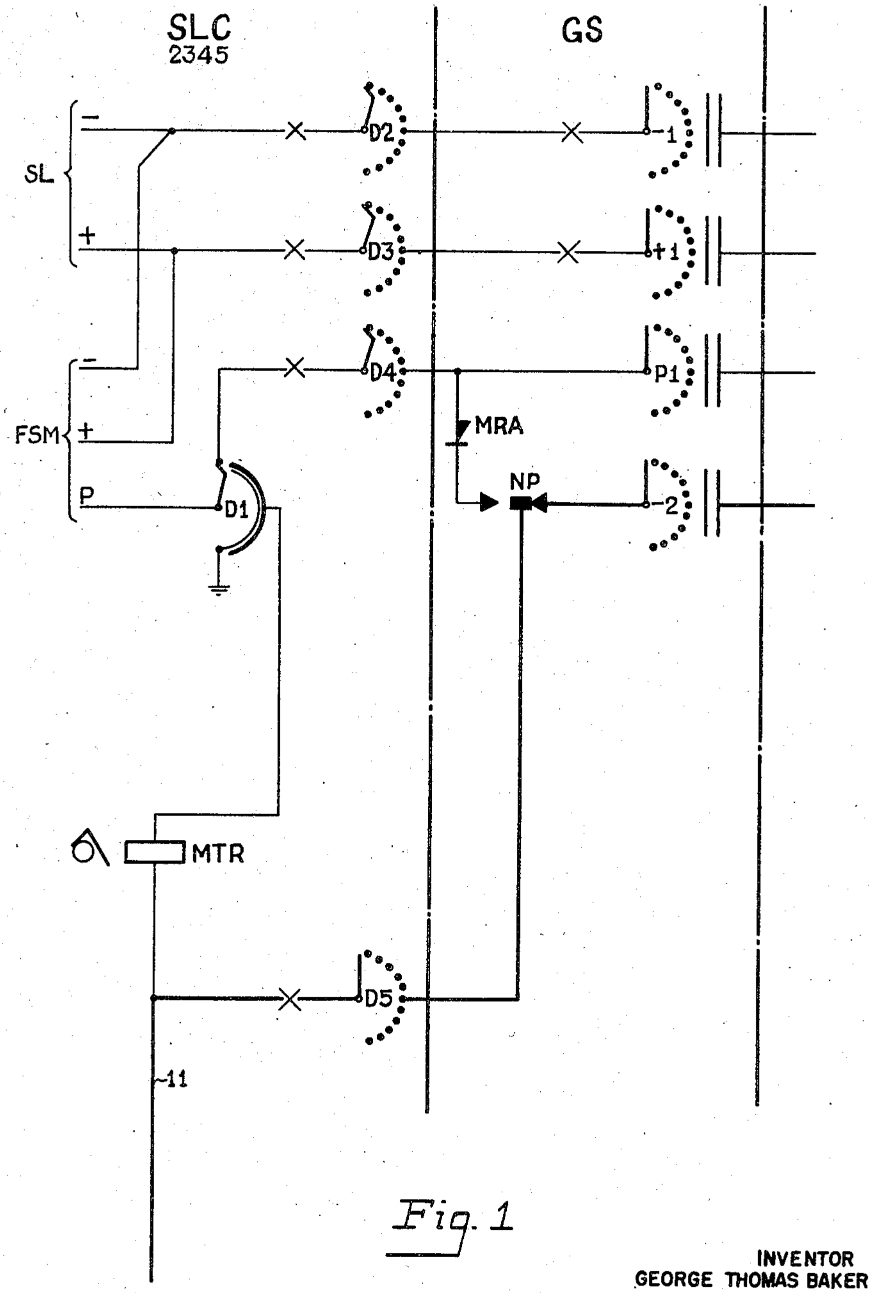

The present invention relates to electrical signalling systems and while it is more particularly concerned with the identification of calling lines in a telephone system and the transmission of the identity to a central point it is also applicable to the general problem of the control of signal transmission and the rapid and succesive marking of leads.

The determination of the identity of the calling line is of obvious value where a long distance call is set up with the assistance of an operator who records the call, in which case the number of the calling line may be displayed on a lamp panel at the operator's position or announced audibly. Calling line identification is, however, essential in systems where the determination of the charge to be made for a call is effected automatically and a ticket is printed with particulars of a call. Such automatic ticketing arrangements are mainly for use in systems where the subscriber is able to set up long distance calls without the intervention of an operator.

The stage in the setting up of a connection at which the identity of the calling line should be determined and transmitted to the control point is a matter of considerable importance and in my copending application Serial No. 672,386, filed May 27, 1946, arrangements are disclosed whereby in the case where the calling subscriber is able to set up the call automatically identification and transmission are effected during the time the called subscriber is removing his receiver. Where the calling subscriber obtains the assistance of an operator, identification and transmission may take place on the seizure of the operator's position relay set. Since the speaking conductors are employed for transmission, the above arrangement can only be successful if the determination and transmission of the identity of the calling line are effected rapidly.

It is the main object of the present invention to provide improved means for high speed identity determination and transmission. A further object of the invention is to provide an arrangement in which the speed of identity determination and transmission is not dependent on the operation of telephone type relays at a speed at which resonance effects in the springs are apparent, making the operation of the relay unreliable. A further object of the invention is to avoid interference between lines being identified or awaiting identification. Finally it is another object of the invention to provide receiving equipment which will respond reliably to the high speed transmission.

According to one feature of the present invention, in circuit arrangements for rapidly and successively applying potentials to combinations of leads, a number of high-speed relays less than the number of different combinations of leads are provided each having a single contact set and static devices are associated with the relays for multiplying the effect of each single contact set.

According to a further feature of the invention in circuit arrangements for line identification by rapidly and successively applying an alternating current marking potential to different combinations of leads common to the lines to be identified, a number of high-speed relays less than the number of different combinations of leads are provided each having a single contact set which serves to connect the primary winding of a transformer to an alternating current source and the effect of each single contact set is multiplied by the provision in each of the leads of an appropriate number of secondary windings.

According to another feature of the invention in circuit arrangements for line identification including means for applying code signals in turn to groups of leads common to the lines to be identified, the leads of each group include one or more secondary windings of a plurality of transformers provided on a basis of one for each unit of the code employed, the primary windings of the transformers being connected successively to a source of alternating current to enable the code signals to be applied to the leads through the secondary windings.

According to a further feature of the invention back coupling between the secondary windings of any non-energised transformers is rendered negligible by a changeover contact associated with each primary winding which is arranged in one position to connect a source of alternating current to the associated primary winding and in the other position to short-circuit the primary winding in order to render negligible the back-coupling between the secondary windings. Conveniently this is effected by providing each high speed relay with a changeover contact set which in the normal position short-circuits the primary winding of the associated transformer.

The operation of the high speed relays is controlled by relay equipment which according to a further feature of the invention is so arranged that the impulsing relay only operates at full impulsing speed. It is thus economic to employ an accurate relay for this purpose while the other relays may be of the ordinary telephone type.

The general principles of line identification employed are similar to those disclosed in United States Patent No. 2,292,977 in which lines having the same thousands digits are multiplied together and similarly for the hundreds, tens and units digits and coded marking signals are applied successively to the common leads. It will be understood that the source of marking signals must be changed over from one set of common leads to another as the digits in the calling line number are successively determined and changeover from one set of common leads to another is prepared in advance.

Voice frequency signals having two different frequencies (e. g. 600 and 750 C. P. S.) are employed for transmission purposes, the signals being received on a standard 2 V. F. receiver. It will be understood that the receiver includes two high speed relays which respond to the voice frequency signal and repeat them to storage equipment. Preferably two groups of high speed relays are provided for responding to alternate transmitted digits, the digit registered on one group being transferred to storage equipment while the next digit is being registered on the second group.

Figure 2:
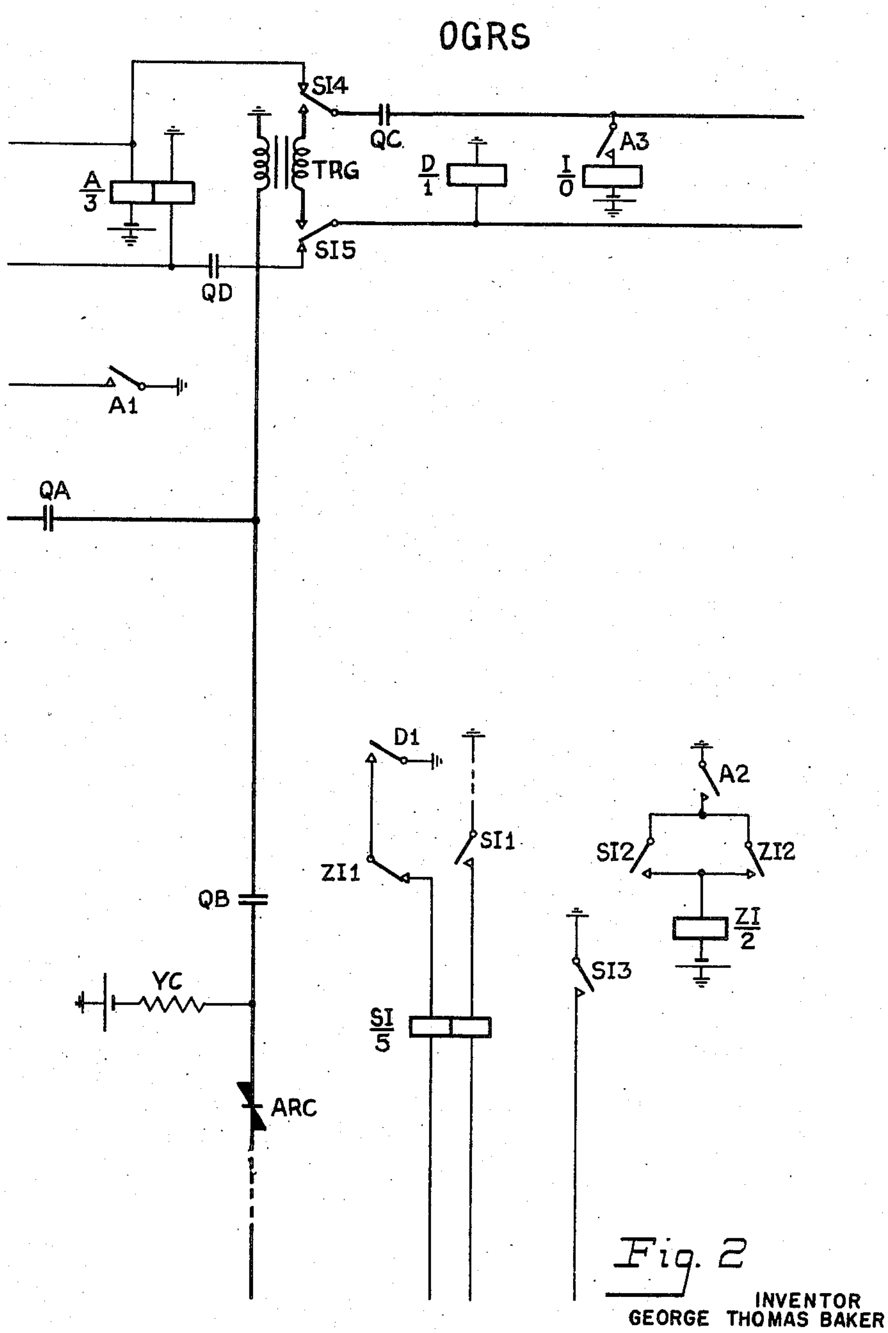
Figure 3:
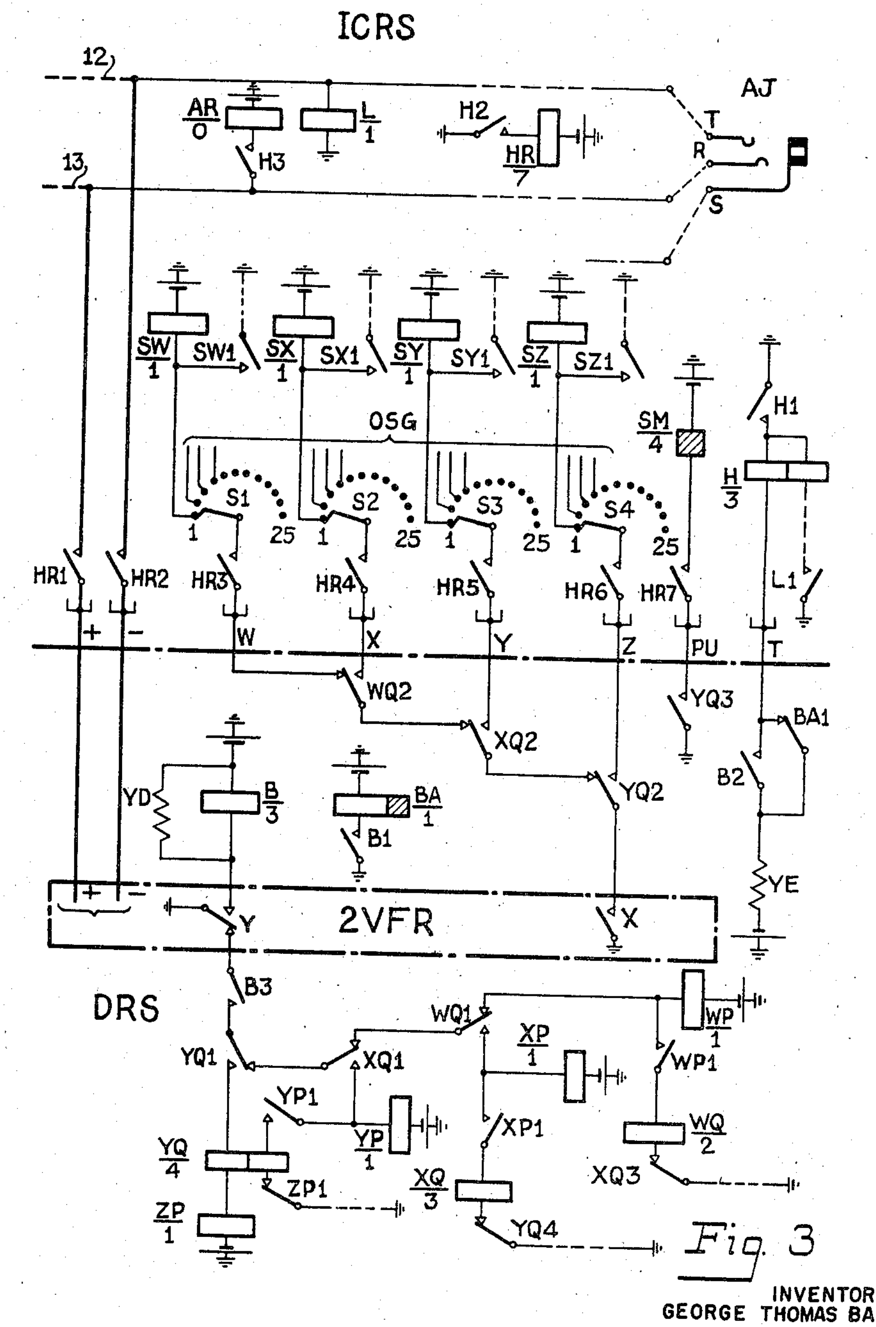
Figure 4:
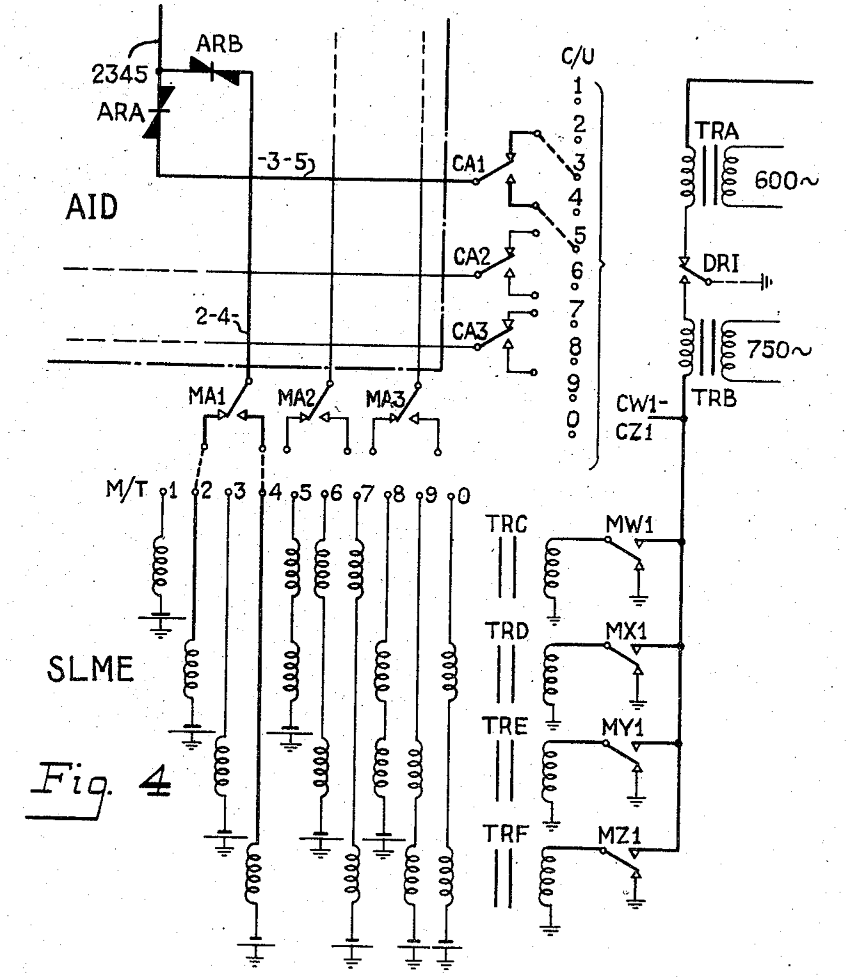
Figure 6:
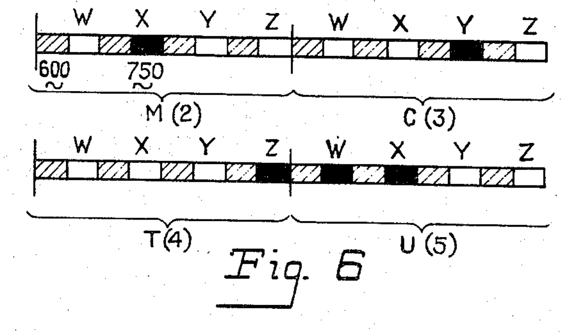
Figure 7:
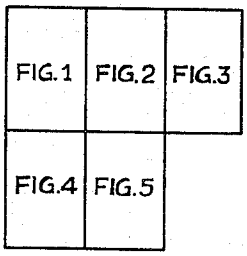
Figure 5:
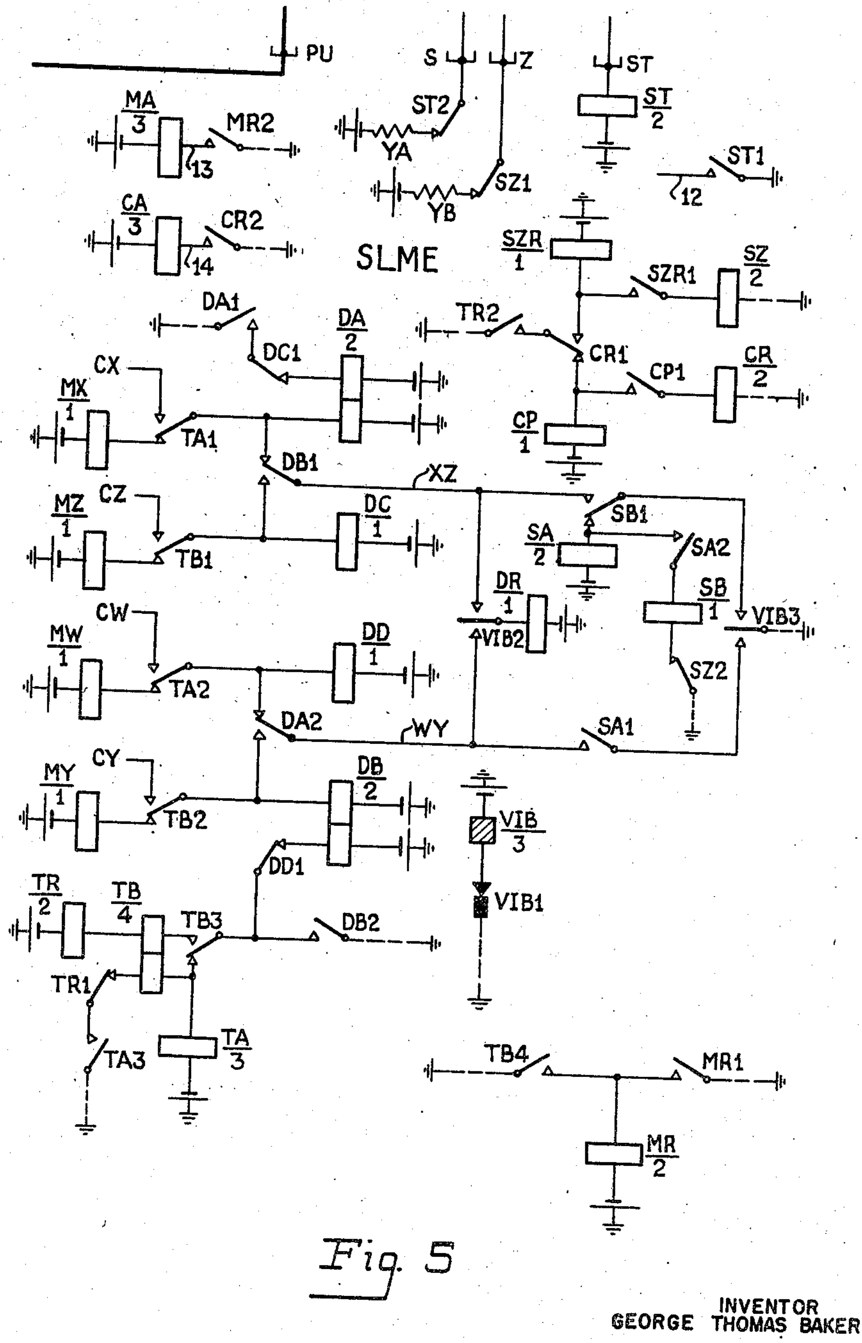

The invention will be better understood from the following description of one method of carrying it into effect taken in conjunction with the accompanying drawings in which:

Fig. 1 shows part of a subscriber's line circuit SLC and part of a 200 output first group selector, Fig. 2 shows part of an outgoing relay set OGRS, Fig. 3 shows in skeleton form the incoming relay set ICRS associated with a manual switchboard position together with the relevant elements of a 2 V. F. receiver, Figs. 4 and 5 show in detail the subscriber's line marking equipment SLME, Figs. 1–5 being arranged as shown in Fig. 7 while Fig. 6 shows schematically the form of the transmitted identity signals.

As previously mentioned line identification is effected in the manner described in United States Patent No. 2,292,977 which is based on a direct forward marking method whereby each line is impressed with a marking characteristic of the calling subscriber's number. The characterising signals are connected to the meter wire at the final selector side of the I. D. F. to obtain correct numerical sequence and the actual feed to the wire is via discs of non-linear resistance material, such as the silicon carbide discs described in United States Patent No. 2,292,977. This arrangement allows the non-linear conductivity characteristic to be used to give a static switching effect to allow identity signals to be impressed on engaged line circuits only, thus considerably reducing the power required. The common or feed side of the discs is connected to battery and on free lines the individual end will also be connected to battery. Thus there is no bias voltage across the disc and it constitutes virtually an open circuit. On busy lines the individual side would be connected to earth and this bias renders the disc conducting to the impressed low voltage voice frequency identity signals. Moreover the discs are robust and small in size and if mounted in the manner suggested give a very compact assembly.

Two discs in juxtaposition are used on each subscriber's line to reduce mechanical switching to a minimum. The common side of each pair of discs is connected to a line circuit, while the other side of one disc is commoned for all subscribers in each 100 having the same units digits and the other side of the other disc is commoned for all subscribers in the 100 group having the same tens digit. Thus the 100 wires are statically reduced to 20 commons, 10 for making the units digit of the subscriber's number and 10 for marking the tens digit.

A further reduction stage is achieved by arranging for the 10 units digit wires to be commoned over all 100-line groups having the same hundreds digit and for the 10 tens digit wires to be commoned over all 100-line groups having the same thousands digit. Thus 10,000 subscriber's markings are reduced in a static manner to 200 wires with a fault liability no higher than a set of connection strips. Since the discs are mounted adjacent to the lines to be marked the amount of cabling involved is very small.

The code employed is the well-known four unit code so that the period for the identification of each digit is divided into four sections. A marking signal in the first section is designated W; in the second X; in the third Y; and in the fourth Z. The code combinations to represent the digits are as follows: 1—W; 2—X; 3—Y; 4—Z; 5—WX; 6—WY; 7—WZ; 8—XY; 9—YZ; 0—XZ. In cases where the transmission of marking signals takes place over two wire trunks or junction lines and through tandem exchanges, these lines will in general already be carrying D. C. signals, so that it is necessary to employ A. C. marking signals and voice frequency signalling is used to take advantage of the 2 V. F. signalling technique. A voice frequency of 750 C./S. is chosen for the marking signal while the spacing signal which also serves as a synchronising signal consists of a voice frequency of 600 C./S.

In the detailed description which follows it is assumed that the subscriber's line SLC has the number 2345 and detailed connections have been shown for this number only. A call requiring identification is set up by the subscriber dialling the requisite digit in the orthodox manner and in response thereto the first numerical selector wipers are stepped up to the bank level allocated to the outgoing relay sets OGRS, one of which is seized. The NP contacts in the selector move to the operated position, as shown in Fig. 1, on that level.

When the outgoing relay set OGRS (Fig. 2) is seized relay A operates over the loop and thereupon at contacts A1 applies guarding earth to the P lead, at contacts A2 prepares an operating circuit for relay ZI, and at contacts A3 extends battery via the impedance coil I over the conductor 12 to operate relay L in the incoming relay set ICRS, associated with the operator's position. Contacts L1 close a point in the circuit for the battery testing relay H which is used to connect with the common distributor relay set DRS. If the latter is not already engaged on an identity cycle, relay H operates over both windings in series to the battery through resistance YE. Upon operating, relay H at contacts H1 provides a holding circuit for itself on the low resistance left hand winding, and at the same time applies a low resistance guarding earth to the common test lead T. Contacts H2 operate relay HR and contacts H3 apply battery via the impedance coil AR over conductor 13 to operate relay D in the outgoing relay set and to cause a start signal to be transmitted to the subscriber's line marking equipment SLME (Fig. 5). Relay HR operating, at contacts HR1 and HR2 connects conductors 13 and 12 to the positive and negative leads respectively, of the 2 V. F. receiver which may be of any well-known type. Other contacts of relay HR connect the incoming relay set to the distributor relay set.

The incoming apparatus is now in a condition to receive voice frequency pulses and the X and Y relays (not shown) in the 2 V. F. receiver will respond to 750 C. P. S. identity pulses and 600 C. P. S. spacing pulses respectively.

When relay D in the outgoing relay set operates it completes a circuit for operating relay SI over the S lead to the subscriber's line marking equipment. Relay SI is held operated by contacts SI1 over the Z lead, dependent upon relay SZ, and is thus maintained until completion of the marking cycle. Contacts SI2 complete the circuit for relay ZI, contacts SI3 extend earth over the ST lead, thereby operating relay ST to start the marking cycle, and contacts SI4 and SI5 open points in the speech conductors and connect the secondary winding of transformer TRG to the outgoing trunk preparatory to sending the identity code signals. Relay ZI operating, at contacts ZI1 disconnects the original operating circuit for relay SI, and at contacts ZI2 provides a holding circuit for itself. Relay ST operating, at contacts ST1 provides holding earth over lead 12 to the dotted connections shown in Fig. 5, and at contacts ST2 disconnects the S lead to prevent other circuits from being connected after a marking cycle has commenced.

It will be noted that when relay ST subsequently releases, as determined by the operation of relay SZ, at the end of the cycle, any number of circuits which might be waiting for line identification can connect to the next marking cycle simultaneously, so that no circuit has to wait for more than a single cycle.

In the subscriber's line marking equipment the

"doubler" relay DR is the only apparatus to operate at full impulsing speed, and may be of the polarised telegraph type with means for controlling the pulse ratio. The vibrator VIB, which oscillates at half impulsing speed, is self-interrupted at contacts VIB1, at contacts VIB2 it controls relay DR and at contacts VIB3 it controls the distribution relays. Other means of producing pulses may, of course, be employed in place of the vibrator as, for example, motor driven cam actuated contacts or contacting means of the motor driven commutator type.

The operation of relay ST causes earth over DR1 normal (Fig. 4) to be connected to the secondary winding of transformer TRA to cause 600 C./S. current to be transmitted over lead PU to the primary winding of transformer TRG and thence via the secondary winding and the two contacts of relay SI over the + and − wires. This pulse constitutes a seizing pulse for the 2 V. F. receiver and lasts until relay DR is operated.

Also on the operation of relay ST, the vibrator VIB begins to operate and the first time the vibrator closes its upper contacts relay SA operates over SB1 and closes a circuit for relay SB which operates when contacts VIB3 are open. Relays SA and SB remain held in series until the end of the cycle when relay SZ operates. Relays SA and SB extend contact VIB3 to relay DR and the remaining relays and when contacts VIB3 are closed in the lower position, relay DR operates to terminate the seizing pulse. Thus this pulse lasts for the period that VIB3 is in its upper and open position while the marking pulses last only for the period that VIB3 is in its upper or lower position.

The sequential operation of the relays in subscriber's line marking equipment with the pulse halving arrangements, will be better understood with reference to the table of relay operations in the marking cycle hereunder, wherein "*o*" denotes "operated"; "*r*" denotes "released"; "L" denotes "lower contacts of VIB operated"; and "U" denotes "upper contacts of VIB operated."

| Digit | Pulse | Vib. | Relay DR | Distribn. Relays | Marking Relays | Digit Counting and Changeover Relays |
|---|---|---|---|---|---|---|
| Thousand | W | open L | *r* | | | |
| | | | *o* | DD*o* | MW*o* | |
| | X | open U | *r* | DD*r* | MW*r* | |
| | | | *o* | DA*o* | MX*o* | |
| | Y | open L | *r* | | MX*r* | |
| | | | *o* | DB*o* | MY*o* | TA*o* |
| | Z | open U | *r* | | MY*r* | |
| | | | *o* | DC*o* DA*r* | MZ*o* | |
| Hundred | W | open L | *r* | DC*r* | MZ*r* | |
| | | | *o* | DD*o* DB*r* | CW*o* | TB*o*, MR*o*, MA*o* |
| | X | open U | *r* | DD*r* | CW*r* | |
| | | | *o* | DA*o* | CX*o* | |
| | Y | open L | *r* | | CX*r* | |
| | | | *o* | DB*o* | CY*o* | TR*o*, TA*r*, CP*o* |
| | Z | open U | *r* | | CY*r* | |
| | | | *o* | DC*o* DA*r* | CZ*o* | |
| Ten | W | open L | *r* | DC*r* | CZ*r* | |
| | | | *o* | DD*o* DB*r* | MW*o* | TB*r*, TR*r*, CR*o*, CA*o* |
| | X | open U | *r* | DD*r* | MW*r* | |
| | | | *o* | DA*o* | MX*o* | |
| | Y | open L | *r* | | MX*r* | |
| | | | *o* | DB*o* | MY*o* | TA*o* |
| | Z | open U | *r* | | MY*r* | |
| | | | *o* | DC*o* DA*r* | MZ*o* | |
| Unit | W | open L | *r* | DC*r* | MZ*r* | |
| | | | *o* | DD*o* DB*r* | CW*o* | TB*o* |
| | X | open U | *r* | DD*r* | CW*r* | |
| | | | *o* | DA*o* | CX*o* | |
| | Y | open L | *r* | | CX*r* | |
| | | | *o* | DB*o* | CY*o* | TR*o*, TA*r*, SZR*o* |
| | Z | open U | *r* | | CY*r* | |
| | | | *o* | DC*o* DA*r* | CZ*o* | |

The next time the vibrator contacts are in the open position, relays DC and CZ release while on the next closing of the vibrator contacts in the lower position relay DD again operates and releases relay DB. Relays CP, CR, SZR and SZ, together with relay TR constitute the digit counting group to determine the completion of the cycle, relays CP, CR and SZR being already operated as described above. Relay TR releases on the release of relay DB and relay SZ, whose circuit was previously shunted at TR2, is now allowed to operate. Relay SZ at SZ1 opens the circuit of relay SI which releases followed by relay ST which removes the holding earth from all the operated relays in the common equipment, the circuit of relays SA and SB being also opened at SZ2. The equipment is now available for further use.

It will be noted from the table that the digit changeover group, relays TA and TB, provides a further halving of relay operating speed. Instead of effecting the complete changeover in one operation, i. e. in the time between two pulses, the action is divided into two stages, the W and X wires commence to change over on the operation of relay TA immediately after the corresponding pulses have been sent. This gives the time of two complete pulses, i. e. the Y and Z to effect the necessary relay operations. Similarly, by the pre-operation of relay TB, the sending time of the W and X pulses is available for energising the appropriate Y and Z relays.

It will also be noted that relay MA (and similar relays wired to lead 13) which is associated with thousand and ten digits marking, is operated immediately after the thousand digits period, and thus has the duration of the hundred digits period to prepare for the transmission of the ten digits. In a like manner relay CA (and similar relays wired to lead 14) is operated after the hundred digits period to prepare for the transmission of the unit digits.

marking the digits must be impressed on four points simultaneously:

W pulse forms part of integers 1; 5; 6; 7.
X pulse forms part of integers 2; 5; 8; 0.
Y pulse forms part of integers 3; 6; 8; 9.
Z pulse forms part of integers 4; 7; 9; 0.

Each transformer has one primary and four secondary windings so that the signal can be applied by one contact to the primary and induced into the four secondaries as required. It will, however, be appreciated that when signals are being transmitted over the secondary windings of TRC, current will also flow through the secondary windings of transformers TRD, TRE and TRF and by back-coupling via the other secondaries of these transformers over the marking wires so that if there are any other lines being identified or awaiting identification an incorrect identification is possible. This is avoided by two precautionary measures, one of which is to short-circuit the primary windings of all non-energized transformers, conveniently over the back contacts of the code relays. The effect of this is to reduce the impedance of the associated secondary windings to a very low value so that the voltage developed across such secondaries is small. The other precautionary measure consists in designing the transformers so that there is a low coupling impedance between the secondaries when the primary is short-circuited. These transformers also serve another function. The biassing current through the non-linear resistors can reach a fairly high value on a large exchange and there is thus a danger of saturation, and large transformers would normally have to be used. This requirement is obviated by connecting the secondaries in opposite directions, so that the steady currents tend to balance out and thus do not magnetise the core.

The marking relay and digit changeover relay sequence for the four digit identity cycle is,

| Thousands Digit | Hundreds Digit | Tens Digit | Units Digit |
|---|---|---|---|
| MW, MX, MY, MZ | CW, CX, CY, CZ<br>MA | MW, MX, MY, MZ<br>CA | CW, CX, CY, CZ |

When relay DR is normal during the above-described cycle of operations, i. e. VIB contacts open, earth is connected to the secondary winding of transformer TRA so that a 600 C. P. S. spacing pulse is extended to the primary winding of transformer TRG as previously described.

When relay DR is operated earth is connected to transformer TRB so that 750 C. P. S. may be applied to primary windings of transformers TRC, TRD, TRE and TRF dependent on which of the marking relays MW, MX, MY and MZ are operated. This serves to mark the "thousands" and "tens" digits, i. e. those corresponding to terminals designated M/T 1–0. In a like manner the 750 C. P. S. may be applied to a corresponding group of transformers by the contact of marking relays CW, CX, CY and CZ shown as lead CW1–CZ1, to mark the "hundreds" and "units" digits, i. e. those corresponding to terminals C/U 1–0.

The transformers TRC—TRF and the corresponding hundreds/units transformers constitute the multiplying means previously mentioned. Now each of the 750 C. P. S. pulse components so that subscriber's line 2345 would be impressed with 750 C. P. S. marking pulses, as indicated in Fig. 6 via the biassed non-linear resistors ARA and ARB to lead 11 from where it is extended via the preselector bank D5, normal post springs NP and wiper —2 of the first numerical selector to the primary winding of transformer TRG in the outgoing relay set. Meantime, 600 C. P. S. pulses are extended, each time relay DR releases, via the PU lead also to the primary winding of transformer TRG. The 750 C. P. S. marking pulses and the 600 C. P. S. spacing pulses combine to give the complete sequence shown in Fig. 6, and the pulses are induced into the transformer secondary winding and passed along the speech wires into the two V. F. receiver where they are transformed into relay operations to be transposed into a visual display or audible announcement of the calling line number as explained hereunder.

Referring now to the operation of the incoming relay set ICRS (Fig. 3) and assuming that the identity of subscriber 2345 is being transmitted, upon receipt of the 600 C. P. S. pulse at the start of the identity cycle, relay Y in the 2 V. F. receiver operates and in turn operates relay B which remains operated during pulse reception due to the shunt resistor YD. Relay B in operating, at contacts B1 operates relay BA, at contacts B2 completes an alternative holding circuit for relay H, and at contacts B3 prepares a circuit for relay WP. Relay BA in operating opens a point in the original operating and holding circuit of relay H. When the 600 C. P. S. pulse is removed relay Y releases to operate relay WP, which at contacts WP1 prepares a circuit for relay WQ. On the second operation of relay Y in response to the second 600 C. P. S. pulse, relay WQ operates in series with relay WP, and at contacts WQ1 prepares to operate relay XP, and at contacts WQ2 opens a point in the W lead to the incoming relay set and closes a point in the X lead. On the second release of relay Y, relay XP operates to prepare for the operation of relay XQ. Relay X now operates for the duration of the first 750 C. P. S. pulse, and at its contacts extends earth over contacts YQ2, XQ2 and WQ2, and the X lead to operate the storage relay SX which locks to earth at contacts SX1. On the third operation of relay Y, relay XQ operates in series with relay XP and at contacts XQ1 prepares a circuit to relay YP, at contacts XQ2 opens a point in the X lead and closes a point in the Y lead, and at contacts XQ3 disconnects relays WQ and WP which now release. On the third release of relay Y, relay YP operates to prepare the operating circuit for relay YQ. On the fourth operation of relay Y, relay YQ operates on its right hand winding in series with relay YP, and at contacts YQ1 prepares a holding circuit for itself, and an operating circuit for relay ZP, at contacts YQ2 opens a point in the Y lead and closes a point in the Z lead, at YQ3 energises the magnet SM of the stepping switch S, and at contacts YQ4 disconnects relays XP and XQ which release. On the fourth release of relay Y, relay ZP operates in series with relay YQ to release relay YP. On the fifth operation of relay Y, due to the 1st 600 C. P. S. pulse associated with the hundreds digit, relays ZP and YQ release and at contacts YQ3 the magnet SM is disconnected to advance the switch wipers to the second set of bank contacts.

The second, third and fourth sets of S switch bank contacts are each wired to individual SW, SX, SY and SZ storage relay sets in a similar manner to those shown. When the hundreds digit (3) pulses are transmitted a similar sequence is repeated, but in this instance relay SY in the second storage group is operated to the 750 C. P. S. pulse, and locks. On completion of the sequence the wipers are stepped to connect with the third storage group wherein relay SZ subsequently operates to the tens digit (4) pulse. On completion of the third sequence the S switch wipers are again stepped and relay SW and SX in the fourth storage group then operate to the units digit pulses. In practice, of course, the four storage relay sets may be multiplied on the S switch bank to save wiper homing time. An alternative arrangement which gives more reliable operation is to provide two sets of four high-speed relays which accept the incoming digit codes alternately, and release the information a digit at a time into the storage groups in the incoming relay set. By this means the latter storage groups are given more time in which to operate and the relay coils may therefore be of higher resistance to reduce the current consumption.

After completion of transmission of the identity cycle relays X and Y finally release and at the Y contacts relay B is disconnected and releases. Contacts B1 disconnect relay BA which releases slowly, contacts B2 open a point in the T lead to release relay H and to remove the switching battery pending the release of relay BA, and contacts B3 disconnect the distributor relays. Relay HR releasing disconnects the 2 V. F. receiver and also disconnects the distributor relay set.

The condition now holds that relay SX in the first relay group, relay SY in the second, relay SZ in the third and relays SW and SX in the fourth relay group, are now operated so that the marking impressed on the calling subscriber's line circuit is set up on storage relays to represent that calling number in coded form. It will be apparent to those skilled in the art that a lamp may be caused to light at the operator's position at this stage, and in answer thereto it could be arranged that a cord circuit plug be inserted into the jack AJ and a key be operated, whereby the stored code might be converted to an audible announcement or visual display of the calling member to the switchboard operator. Alternatively in the case where particulars of a connection are collected for determining automatically the charge to be made for the connection, the calling party's number may remain stored on the storage relays until the termination of the connection when it is transferred to equipment for determining the charge and to printing equipment for recording the particulars of the connection.

It will be understood that the invention is not limited to the embodiment described above and various modifications which will be apparent to those skilled in the art may be made, all of which fall within the scope of the invention. For instance although the embodiment described caters for a four digit exchange it will be apparent that fewer digits can be used without effect effecting the general arrangement. Where more digits are required, the subscribers may be split into groups as, for instance, separate exchanges and a discriminating digit or digits may be fed in at a common point such as the outgoing relay set and do not affect the identification equipment in general. Further other means of pulse generation may be employed instead of the vibrator, such as, for example, motor driven cam actuated contacts of contacting means of the motor driven commutator type.

I claim:

1. In a line identification system, a line, a plurality of marking leads, different ones of said leads associated with said line in accordance with the line designation thereof, a plurality of high speed relays less in number than the number of leads, each having only a single pair of make contacts, means for rapidly operating said relays in succession, and means responsive to the closing of said contacts for successively applying, alternating potential to different combinations of said leads to send signals corresponding to a line designation.

2. A system such as claimed in claim 1 in which said last means comprises a plurality of transformers and in which each of said leads has a secondary winding of one or more of said transformers included therein, and in which the operation of each relay completes a primary circuit through its closed make contacts for one of said transformers to thereby induce alternating current in more than one of said leads.

3. In a line identification system, a plurality of lines, marking leads connected to said lines in certain combinations according to the line designations thereof, a plurality of transformers each having a primary and a plurality of secondaries, each secondary connected in one of said leads, a high speed relay operative to cause a potential in the primary of each transformer, and means for sequentially operating said relays to thereby cause the inducing of a potential in different combinations of said leads successively.

4. In an electrical system, a plurality of marking leads each representing a different numerical digit, a code corresponding to each digit composed of one or more momentary potentials applied to the marking lead in a definite time interval within a definite time period, a plurality of transformers less than the number of marking leads each consisting of a primary winding and a plurality of secondary windings, the secondary windings of each transformer connected in certain of the marking leads, each secondary winding of one transformer being connected singly in a marking lead or in combination with a secondary winding of another transformer in such a manner that successive momentary potentials on the primary windings will induce like momentary potentials in the secondary windings thereby producing the code in each of the marking leads, and a plurality of high speed relays each having a single pair of make contacts for rapidly and successively applying momentary potentials to the primary windings.

5. In a line identification system, lines having different designations including more than one order of digits, a plurality of groups of marking leads, a plurality of transformers each having a primary and a plurality of secondary windings, the secondary windings of each transformer included in a plurality of said leads, a plurality of series of relays each operative to cause a momentary alternating current flow in the primary of one of said transformers, means for sequentially operating one series of relays to cause the inducing of an A. C. potential successively in a plurality of the leads in one group for one order of digits, and means for then causing said first means to sequentially operate another series of relays to cause the inducing of an A. C. potential successively in a plurality of the leads in another of said groups for another order of digits, and means connecting each line to said leads in accordance with the designation thereof.

6. In a line identification system, lines each having a designation including a plural digit number, means for transmitting coded signals to identify each line in accordance with its designation number including a pair of groups of marking leads and a pair of groups of relays each having only a single pair of make contacts, means for operating the relays of one group sequentially and for then operating the relays of the other group sequentially, means responsive to the operation of said relays in said one group, to cause a flow of alternating current in different pluralities the leads of one group for each relay operated, means responsive to the operation of said relays in said other group to cause a flow of alternating current successively in different pluralities of the leads in the other group for each relay operated, and means for then repeating the operation of said two groups during the same call, each line connected to said leads in accordance with its designation and each operation of a group of relays sending signals representing a digit of a different order.

7. In a telephone system, a line identification system for calling lines, in which there are a plurality of groups of marking leads and a pair of series of relays each less in number than the number of leads in its associated group, cross connections from each line to leads of each group in accordance with the line designation of the line, means responsive to the extension of a call from a line for transmitting a plurality of series of spacing impulses each series representing a four space code, and means including relay equipment for interspersing impulses of a different character in different ones of the spaces of each of said series of impulses in accordance with the cross connections of the calling line to said groups of leads.

8. An identification circuit for the lines of a telephone system comprising in combination with an identifying conductor for each line, an impulse device for transmitting impulses, two groups of relays, a single contact set on each of said relays, a plurality of transformers each comprising a primary winding and a plurality of secondary windings, different ones of said primary windings associated with different ones of said relays, circuit means including the single contact set of relays for energizing the primary winding associated with each relay in response to the operation of the relay, a first plurality of circuits associated with said first group of relays each connected to a different one of said identifying conductors and each comprising one of said secondary windings or two secondary windings of different transformers, a second plurality of circuits associated with said second group of relays each connected to a different one of said identifying conductors and each comprising one of said secondary windings or two of said secondary windings of different transformers, and circuit means for causing the sequential operation of the two groups of relays and the sequential operation of the relays in each group in response to said transmitted impulses to thereby cause sequential energization of said plurality of transformers to in turn cause energization of the secondary windings and a resultant potential in certain of said first and second plurality of circuits for the purpose of marking the identifying conductors of the lines.

9. In a telephone system, calling lines, each line having a numerical designation of a plurality of order of digits, means for transmitting signals in code to identify the designation of a line when calling, said means including a group of marking leads certain of which are associated with each line in accordance with its designation, a series of relays less in number than the number of leads, each of said relays controlling certain of said marking leads, a source of alternating current, means for operating said series of relays sequentially to thereby connect said alternating current by way of a certain marking lead associated with said calling line during a certain period of time over the line either one or a plurality of times during said certain period of time to send a signal corresponding to a digit of one order, and means for then causing said second means to reoperate said relays in sequence during the same call to thereby connect said alternating current by way of a certain other marking lead associated with said calling line during a certain other period of time over the line either one or a plurality of times during said certain other period of time to send another signal corresponding to a digit of another order.

10. In a telephone system as claimed in claim 9, a second group of marking leads certain of which are associated with each line in accordance with its designation, and a second series of relays less in number than the number of said second group of marking leads, said second means also operating said second series of relays sequentially during the same call to thereby connect said alternating current by way of a certain marking lead in said second group of marking leads associated with said calling line during still another certain period of time over the line either one or a plurality of times during said third certain period of time to send a signal corresponding to a digit of a third order, said means then causing the reoperation of said second series of relays in sequence during the same call to thereby connect said alternating current by way of a certain other marking lead in said second group of marking leads associated with said calling line during a fourth certain period of time over the line either one or a plurality of times during said fourth certain period of time to send another signal corresponding to a digit of a fourth order.

11. In a telephone system as claimed in claim 10, means for first connecting a marking lead from each group of marking leads with the calling line to determine the signals transmitted for two orders of digits, and means for then connecting a second lead from each group of marking leads with the calling line to determine the signals transmitted for two other orders of digits.

GEORGE THOMAS BAKER.

REFERENCES CITED

The following references are of record in the file of this patent:

UNITED STATES PATENTS

| Number | Name | Date |
|---|---|---|
| 1,846,261 | Kittredge | Feb. 23, 1932 |
| 1,864,553 | Quass | June 28, 1932 |
| 2,077,537 | Taylor | Apr. 20, 1937 |
| 2,252,766 | Holden | Aug. 19, 1941 |
| 2,265,844 | Korn | Dec. 9, 1941 |
| 2,292,977 | Taylor et al. | Aug. 11, 1942 |
| 2,424,585 | Simon | July 29, 1947 |
| 2,440,277 | Kruithof | Apr. 27, 1948 |

FOREIGN PATENTS

| Number | Country | Date |
|---|---|---|
| 547,836 | Great Britain | Sept. 14, 1942 |